May 6, 1969

H. DILCHERT ET AL  3,442,084
MULTISTAGE SOLID FUEL ROCKET PROPULSION UNIT
FOR THE PLACING OF DEPTH CHARGES
Filed Sept. 21, 1967

INVENTORS
HEINZ DILCHERT
RUDOLF CRAMM
JOACHIM FIBRANZ

BY *Craig & Antonelli*

ATTORNEYS

_United States Patent Office_

3,442,084
Patented May 6, 1969

3,442,084
MULTISTAGE SOLID FUEL ROCKET PROPULSION UNIT FOR THE PLACING OF DEPTH CHARGES
Heinz Dilchert, Steyerberg, Rudolf Cramm, Nienburg an der Weser, and Joachim Fibranz, Liebenau, Germany, assignors to Dynamit Nobel Aktiengesellschaft, Troisdorf, Germany
Filed Sept. 21, 1967, Ser. No. 669,496
Int. Cl. F02k 9/04
U.S. Cl. 60—250                                 11 Claims

ABSTRACT OF THE DISCLOSURE

A multistage rocket having a plurality of separate serially arranged combustion chambers, each containing a solid fuel propellant charge and an independent ignitor, with all of the combustion chambers arranged to exhaust the propulsion gases out of a common exhaust nozzle device. Check valves are arranged between adjacent combustion chambers to prevent the forward propagation of an igniting flame and forward passage of combustion gases, while allowing the same to move in the rearward direction. The range of the rocket may be controlled in steps, for a given firing angle, by igniting the fuel within the desired combustion chamber, which will in turn only ignite the fuel in all of the combustion chambers rearwardly thereof but not forwardly.

Background of the invention

Figure 1:
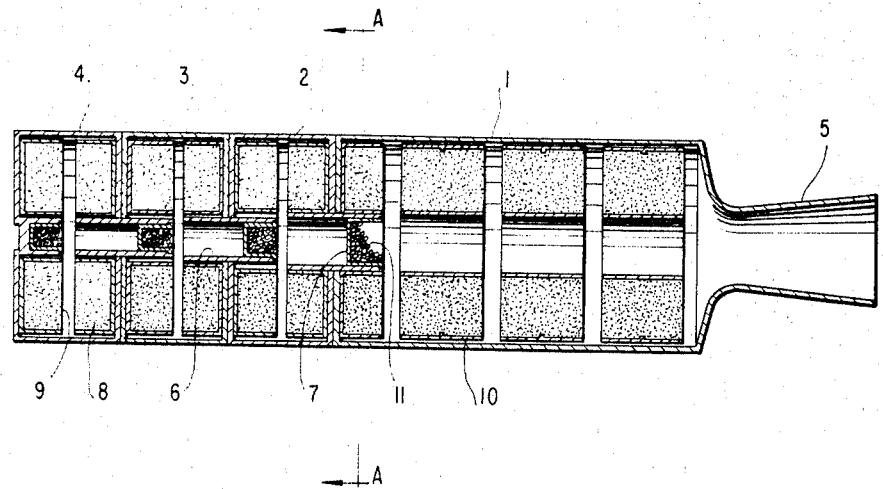

Solid fuel rockets have a maximum attainable range when the most favorable rocket departure angle is adhered to. Solid fuel rockets having a predetermined propellant charge efficiency may have their flying range conveniently decreased with respect to the maximum attainable range by deviating from the most favorable angle of departure of the rocket toward either a lower or a higher value thereof. However, when deviating to a lower departure angle, the flight path becomes flatter and correspondingly the angle of impact becomes smaller, that is flatter. A flatter flight path is undesirable in many circumstances, for example when employing the rockets as rocket propulsion units for throwing depth charges where a charge impact angle must be maintained to preclude with certainty a skipping of the depth charge along the water level or an oblique slideslipping of the depth charge in the water; therefore, a substantial flattening of the impact angle cannot be tolerated when placing depth charges. Although the above disadvantages are not present when deviating from the most favorable angle of departure toward a higher angle of departure because the angle of impact becomes correspondingly larger, a higher angle of departure has the disadvantage that in the case of very large departure angles for close targets, the very steep flight parabolas with relatively high apices of the flight path are encountered. With such a flight path, strong winds and other factors will greatly influence the flight path to produce substantial flight path deviations, and in extreme cases even the firing location as well as the close vicinity thereof may be endangered.

Flat angles of impact and flight path apices that are too high, together with the disadvantages inherent therein, may be avoided by conventionally maintaining substantially fixed departure angles for all target distances corresponding substantially to the most favorable angle of departure, and employing propellant charges of different efficiencies and characteristics corresponding to the desired target distance. However, the use of solid fuel one piece rockets would require an extremely large number of rockets or rocket propulsion units of widely varying characteristics to be kept ready at all times, which is accordingly cumbersome and expensive. Alternatively, a plurality of different propulsion units having various characteristics may be provided so that the one corresponding to the desired flight distance may be chosen and inserted into the rocket at the time of firing, but this would not meet the general requirement that the rocket should be ready for firing within a few seconds after the target has been located.

These disadvantages are avoided in a known solid fuel rocket propulsion unit consisting of a combination of several individual propulsion units wherein an even number of, for example, eight additional propulsion units are arranged around a centrally provided basic propulsion unit, and wherein, depending upon the particular requirements, only the basic propulsion unit or additionally an even number of pairs of exactly oppositely positioned additional propulsion units are fired, that is, for example, two, four, six, or the total of eight additional propulsion units. However, there are the disadvantages in this arrangement that, on the one hand, it has a poor capacity factor, that is the space available is not well used and, on the other hand, there is the danger of an indefinite or uncontrolled flight direction of the rocket in case there is an ignition failure or delay in one of the additional propulsion units.

Summary of the invention

It is an object of the present invention to provide a solid fuel rocket of simple and economical construction wherein the flight characteristics may be quickly and readily changed in a safe and reliable manner without the above-mentioned disadvantages.

According to the present invention, a multistage rocket is provided with two or more coaxially arranged or serially arranged combustion chambers for exhausting propellent gases out of the common jet or group of jets and individually provided with charges of the same or a different efficiency or characteristics. Each of the combustion chambers is provided with a complete and independent ignitor, that is one that may be triggered by itself. Between adjacent combustion chambers, there are provided check valves to prevent forward travel of the combustion gases. With such an arrangement, the desired combustion chamber is ignited to conduct combustion gases rearwardly and in turn ignite the propellant charges in the rearwardly positioned combustion chambers, while at the same time the check valves forward of the ignited combustion chamber will prevent forward travel of the combustion gases so that the forwardly position combustion chambers will not have the propellent charges therein ignited. Such a system prevents, with certainty, the involuntary ignition of propellent charges not needed to obtain the desired flight characteristics.

Figure 2:
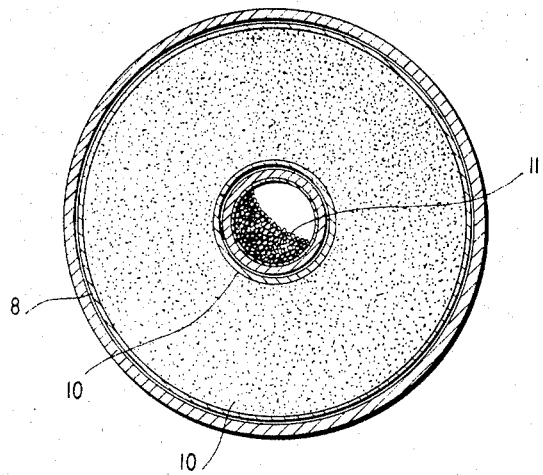

Further objects, features and advantages of the present invention will become more clear from the following detailed description of a preferred embodiment, with reference to the accompanying drawing wherein:

FIGURE 1 is an axial cross sectional view of a propulsion unit according to the present invention; and FIGURE 2 is a partial cross sectional view taken along line A—A of FIGURE 1.

Detailed description

The four-stage propulsion unit according to the present invention that is shown in FIGURE 1 is provided with four combustion chambers 1, 2, 3, 4, respectively that are arranged coaxially with respect to each other and the central longitudinal axis of the rocket. The combustion chambers 1–4 are connected with each other at adjacent ends to discharge the combustion gases out of a common nozzle unit 5. Each of the combustion chambers has a separate solid fuel propellent charge 8. The rear of the combustion chamber 1 is directly adjacent to the nozzle unit 5, whereas the combustion chambers 2, 3, 4 are provided at the rears thereof only with the central gas passage openings 6; the gas passage opening of the combustion chamber 2 continues into a further gas passage opening formed at the front face of the combustion chamber 1, the other combustion chambers are similarly constructed. The gas passage opening 6 between adjacent combustion chambers are individually sealed by means of stoppers or check valves 7, which are cup-shaped and provided with ignitors therein. Each of the check valves 7 have an annular collar at their rear end which axially seats on the tubular linings of the gas passage openings 6 to prevent forward axial displacement of the stoppers 7 while allowing rearward axial displacement thereof to constitute the stoppers one way or check valves. An additional ignitor 11 is provided in the front face of the combustion chamber 4 so that each of the combustion chambers has an ignitor associated therewith. In each of the combustion chambers, the propellent charge 8 is a front burner, which ignites at the axial end surfaces 9 facing each other, and are protected against ignition at their other surfaces by the insulating walls 10.

As can be seen from the drawing, the propulsion unit has four stages that may be ignited in different combinations, with the firing angle remaining the same, to determine the firing range. That is, the propellent charge of the combustion chamber 1, representing stage one, may be ignited; the propellent charges of the combustion chambers 1 and 2 representing stage two, may be ignited, and so forth. In actual practice, it is possible to slightly reduce the range of the individual stages by moderately increasing or decreasing the firing angle from the most favored firing angle without producing the disadvantages noted above because of the small deviation so that the range approaches to a greater or lesser extent the maximum range of the next stage. Therefore, it is possible to provide a fine adjustment of the firing range throughout the entire range of the rocket up to the maximum range of the highest stage, under favorable conditions.

For firing the desired stage, it is only necessary to ignite the ignitor 11 that is associated with the particular stage. For firing the first stage formed by the combustion chamber 1, only the ignitor 11 provided at the transition from the combustion chamber 1 to the combustion chamber 2 needs to be fired. For firing the third stage, for example, that is formed by the combustion chambers 1, 2, 3, it is only necessary to fire the ignitor 11 at the transition from the combustion chamber 3 to the combustion chamber 4. Other stages are fired in a similar manner. The stopper or plug that contains the ignitor that is fired for the first three stages operates as a check valve to prevent the passage of the ignition jet forwardly as well as the penetration of the propellent gases developed thereafter forwardly so that ignition of the propellent charge within the combustion chambers located forwardly of the desired ignitor is prevented. When firing the first stage, all of the plugs or stoppers 7 remain in their illustrated positions. When firing the other stages, all of the plugs or stoppers 7 that are located rearwardly of the ignitor that is fired are pushed rearwardly out of their seats due to the propellent gases produced by ignition of the associated forwardly placed propellent charge, that is for the second, third and fourth stages. When the propellent charges within one of the combustion chambers 2, 3, 4 are ignited, the resulting propellent gases dislodge the rearward plugs and rapidly move rearwardly to ignite the rearwardly located propellent charges in the subsequent combustion chambers, until finally all of the propellent charges located in the rearward chambers are ignited and the propellent gases of the respective stage are then discharged together through the common exhaust nozzle 5.

In order not to impede the ejection of the stoppers or plugs 7 upon firing the propellent charges 8, the inside cross section of the central gas passage openings increase in the rearward direction and correspondingly the exterior diameter of the plugs 7 increase in the rearward direction, that is from combustion chamber 4 toward combustion chamber 1. Thus, the forward most stopper 7 may easily pass rearwardly and out of the nozzle unit 5.

The firing of the individual ignitors may be accomplished in a variety of ways, for example, by means of an electric current source (not shown) through leads or the like (likewise not shown) which are passed through, for example, between the front walls of the combustion chambers. According to the broader aspects of the invention, there are other possibilities in regard to the number of plugs and combustion chambers, as well as the arrangement and construction of the combustion chambers, propellent charges, check valves, and igniting elements.

Although a single preferred embodiment of the present invention has been described in detail for purposes of illustration, further modifications, variations and embodiments of the present invention are contemplated within the spirit and scope of the following claims.

We claim:
1. A multistage solid fuel rocket, comprising: a rocket casing; rocket nozzle means; wall means dividing said casing into at least a plurality of serially arranged separate combustion chambers; passage means serially connecting all of said chambers with said nozzle means; each of said chambers having an axially burning separate solid fuel propellent charge with a generally radially extending free burning face and separate ignitor means selectively ignitable for igniting the associated propellent charge; check valve means between adjacent chambers for allowing passage of combustion gases from one chamber to the adjacent chamber in the direction of fluid flow toward said nozzle means and preventing passage of combustion gases from one chamber to the adjacent chamber counter to the direction of fluid flow toward said nozzle means.

2. A multistage solid fuel rocket, comprising: a rocket casing; rocket nozzle means; wall means dividing said casing into at least a plurality of serially arranged separate combustion chambers; passage means serially connecting all of said chambers with said nozzle means; each of said chambers having a separate solid fuel propellent charge and separate ignitor means selectively ignitable for igniting the associated propellent charge; check valve means between adjacent chambers for allowing passage of combustion gases from one chamber to the adjacent chamber in the direction of fluid flow toward said nozzle means and preventing passage of combustion gases from one chamber to the adjacent chamber counter to the direction of fluid flow toward said nozzle means; each of said check valve means comprising a cup-shaped stopper opening in the direction of fluid flow toward said nozzle means and mounted within and blocking said passage means between adjacent chambers; said cup-shaped stopper having annular flange means abutting against said wall means in one axial direction and being uninhibited in the opposite axial direction.

3. The device of claim 2, wherein said passage means step-wise decreases in diameter in the direction counter to the fluid flow direction toward said nozzle means and the associated stoppers correspondingly decrease in diameter so that they may pass freely downstream through said passage means and said nozzle means.

4. The device of claim 3, wherein said casing is cylindrical with a longitudinal axis at the front and rear; each of said propellent charges is annular and concentric with respect to said axis; said passage means being central and concentric with respect to said axis; said nozzle means comprising a single nozzle at the rear of said casing and concentric with respect to said axis; each of said cup-shaped stoppers being substantially cylindrical and concentric with respect to said axis; said wall means including insulating material between adjacent combustion chambers and between said propellent charges and the wall means that defines said passage means; said wall means including an annular passage from said passage means opening into the associated combustion chamber, for each of said combustion chambers; said propellent charges for each of said combustion chambers having at least two opposed radially extending annular ignition surfaces radially aligned with the respective annular passage.

5. The device of claim 1, wherein said passage means step-wise decreases in diameter in the direction counter to the fluid flow direction toward said nozzle means and the associated check valve means correspondingly decrease in diameter so that they may pass freely downstream through said passage means and said nozzle means.

6. The device of claim 2, wherein said casing is cylindrical with a longitudinal axis at the front and rear; each of said propellent charges is annular and concentric with respect to said axis; said passage means being central and concentric with respect to said axis; said nozzle means comprising a single nozzle at the rear of said casing and concentric with respect to said axis; each of said cup-shaped stoppers being substantially cylindrical and concentric with respect to said axis; said wall means including insulating material between adjacent combustion chambers and between said propellent charges and the wall means that defines said passage means; said wall means including an annular passage from said passage means opening into the associated combustion chamber, for each of said combustion chambers; said propellent charges for each of said combustion chambers having at least two opposed radially extending annular ignition surfaces radially aligned with the respective annular passage.

7. The device of claim 1, wherein said casing has an axis passing concentrically through said nozzle means, and said combustion chambers are axially aligned.

8. The device of claim 2, wherein said casing has an axis passing concentrically through said nozzle means, and said combustion chambers are axially aligned.

9. The device of claim 3, wherein said casing has an axis passing concentrically through said nozzle means, and said combustion chambers are axially aligned.

10. The device of claim 1, wherein said check valve means comprises a plurality of stoppers, mounted within and blocking said passage means between adjacent combustion chambers, respectively; said stoppers having abutment means preventing movement counter to and allowing movement with the direction of fluid flow toward said nozzle means.

11. The device of claim 1, wherein each of said chambers includes an additional axially burning separate solid fuel propellent charge with a generally radially extending free burning face axially opposed to said free burning face of the adjacent first-mentioned charge.

References Cited

UNITED STATES PATENTS 3,128,600  4/1964  Oldham _____ 60—250

CARLTON R. CROYLE, *Primary Examiner.*

U.S. Cl. X.R.

60—256